Feb. 20, 1940.  W. GRIMSHAW  2,190,944
PIPING FOR FIRE EXTINGUISHING SPRINKLER SYSTEMS
Filed June 18, 1938
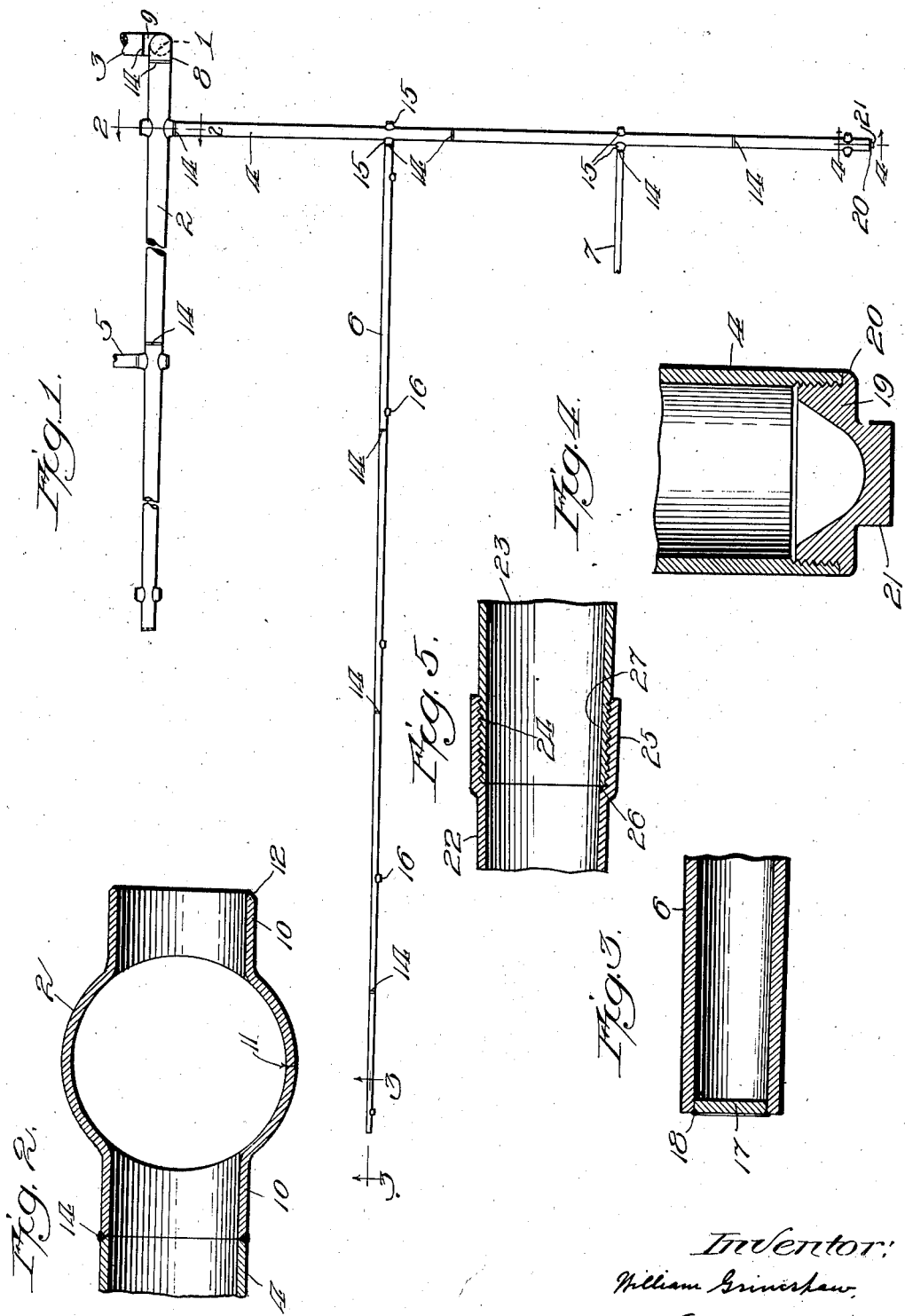

Patented Feb. 20, 1940

2,190,944

UNITED STATES PATENT OFFICE 2,190,944

PIPING FOR FIRE EXTINGUISHING SPRINKLER SYSTEMS

William Grimshaw, Oak Park, Ill.

Application June 18, 1938, Serial No. 214,527

3 Claims. (Cl. 169—16)

Where buildings are equipped with fire extinguishing sprinkler systems, it is necessary to employ pipes decreasing in diameter from the point at which the water is supplied, usually a connection with a city water main, to the most remote sprinkler head. The number of different sizes of pipes depends, of course, on the size of each particular system and of the ramifications of the piping. In any event, under the present practice ordinary pipes are employed, requiring fittings to connect them together and leaving abrupt shoulders where two pipes of different diameters are joined. Even the means for connecting the sprinkler heads to their respective pipes involves the use of fittings and creates pockets in which water and sediment can be trapped.

The object of the present invention is to make possible a pipe system free from internal pockets or traps and requiring no fittings for the assembly of the parts thereof.

In carrying out my invention, I construct pipes in the form of frustums of cones having small angles, so that each pipe decreases gradually and uniformly in diameter from one end toward the other, at all times maintaining the necessary cross sectional areas throughout the length thereof. Where a long pipe or line is needed, any desired number of frusto-conical sections may be placed together end to end and welded together. The ends of each pipe section are so shaped that welded butt joints can readily be made. For the purpose of connecting a pipe to lateral branches or to the sprinkler heads, they are provided with integral sleeve-like projections with which suitable joints are made. The pipes are preferably formed from sheet metal cut to pattern and having the sleeve-like hubs or projections pressed out of the material of the same; each sheet being then rolled into the form of a tube and the meeting long edges being welded together. The risers in building, and other large pipes are conduits that may be cylindrical throughout their lengths, are preferably constructed in the same way as the frusto-conical elements, namely from sheet metal having sleeve-like hubs or projections pressed out of the metal thereof to permit a connection to be made with the local distributing systems.

Therefore, viewed in one of its aspects, the present invention may be said to have for its object to produce a simple and novel pipe formed from sheet metal and provided with integral stubs to form parts of branch or lateral pipes or conduits.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a more or less diagrammatic plan of a fragment of a fire extinguishing sprinkler system embodying the present invention; Fig. 2 is a section on a greatly enlarged scale on line 2—2 of Fig. 1; Fig. 3 is a section on line 3—3 of Fig. 2, on a still larger scale; Fig. 4 is a section on line 4—4 of Fig. 2, on the same scale as Fig. 3 and Fig. 5 is a section of a screw joint between the pipe sections.

In the drawing I have illustrated a fragment of a sprinkler system in which all of the pipe members are frusto-conical, thereby illustrating the manner in which the principle of my invention may be applied to the so-called "trunks," "cross mains" and "lines"; it being obvious that wherever cylindrical pipes or pipe sections suffice, they may be employed. Thus, the supply of water may be delivered to a given floor of a building through a riser 1 which may be cylindrical. Connected to this riser are a pair of trunks 2 and 3. All dimensions and proportions, as well as the number and distribution of pipes or conduits, of course depends upon the nature of the space which is to be protected against fire. In a typical installation, the riser or other supply main might be an eight-inch pipe, and the trunk 2 could decrease in diameter from eight inches to the inlet and to, say, four inches at the closed end. Any desired number of cross mains could be connected to the trunk. In the drawing there is shown a complete cross main 4 and a fragment 5 of a second cross main. If the cross main 4 is around five inches in diameter at the inlet end, it may taper until its diameter is reduced to half that amount at the other end. Connected to the cross mains are the lines that carry the actual sprinkler heads, one complete line 6 and a fragment 7 of another line being shown. The lines 6 and 7 may, for example, taper from a diameter of two inches at the inlet ends to a diameter of one and one-quarter inches at their closed ends.

The present invention, however, is not concerned with the particular distribution of the pipes or conduits, but only with what may be termed the structure of individual pipes or conduits and of the assembly as a whole, whereby fittings are eliminated, the system is left free from pockets and traps to hold water and sediment; and, with a comparatively few different sizes of frusto-conical pipe or conduit sections, it is possible quickly to assemble all of the elements required for a complete sprinkler system, no matter how elaborate it may be.

In accordance with one feature of my invention, the various pipes or conduits are formed from sheet metal or metal plate, each conduit being provided with integral sleeve-like projections to which what may be termed branch pipes or conduits are welded in making an assembly. When a long pipe or conduit is required, the requisite number of sections, of the proper sizes, are placed end to end and are welded to each other so that the whole constitutes a single tubular member decreasing gradually in diameter.

In the particular arrangement illustrated, the supply main or riser 1 has formed integral therewith, short, lateral sleeve-like projections 8 and 9 against which the trunks 2 and 3 abut and to which they are welded. The member 2 has the metal thereof worked into sleeve-like projections 10 at points where cross mains are to be connected; the sleeve-like projections being of such diameters as to correspond to the diameters of the inlet ends of the cross mains to which they are joined.

As is best seen in Fig. 2, the pipe or conduit 2 is formed from a heavy sheet or plate rolled into tubular form and having its meeting ends welded together to produce the joint 11. The sleeve-like projections 10 are chamfered or bevelled at their outer ends, as indicated at 12, so that when a cross main, element 4, for example, is butted against one of the projections, there is formed between these elements a continuous, peripheral V groove which may be filled with metal, as indicated at 14, in the process of welding the cross main to the trunk. The ends of the pipe sections, themselves, are also preferably bevelled, so that when two pipe sections have ends of equal diameter engaged with each other there is formed a peripheral annular groove to receive the metal deposited in making a weld.

The cross mains and the lines are constructed in the same way as the trunk, just described, only as their diameters decrease, thinner sheets or plates are employed. However, each cross main is provided wtih a requisite number of integral sleeve-like projections 15, properly distributed, and each of the "lines" on which the sprinkler heads are to be mounted is provided with a proper, integral sleeve-like projection 16 to which the sprinkler heads may be secured.

The free ends of the trunks and of the lines that carry the sprinkler heads may be closed by means of discs fitting into and welded to the same. Such a disc, indicated at 17, is shown in the free end of the pipe or line 6 in Fig. 3; the disc being welded to the surrounding pipe, as indicated at 18.

It is sometimes desirable to clean out the system by blowing fluid back through the same. It is sufficient, for this purpose, that the fluid used in the cleaning process be blown back through the cross mains, and I therefore provide each cross main with a detachable plug in the free end. Upon the removal of the plug, a connection may be made with a source of supply of fluid under pressure. This plug, as shown in Fig. 4, may be a simple cup-shaped body member 19 externally screw-threaded so as to permit it to be screwed into the end of the pipe. The member 19 preferably has a flange 20 that abuts against the end face of the pipe, and is provided with an outwardly projecting, wrench-receiving head 21 by means of which it may be screwed into or unscrewed from the pipe.

Instead of welding the various joints, meeting tubular elements may be screwed together. This may be done without creating pockets or traps by expanding the end of the large pipe and contracting the end of the smaller pipe into cylindrical shapes; the larger cylindrical portion meeting the body portion of the pipe of which it forms a part in a shoulder against which the cylindrical end on the smaller pipe may abut and thus leave the interior surface of the joined pipes smooth and continuous across the joint. The larger cylindrical part may be internally screw-threaded and the cooperating cylindrical part be threaded externally, whereby the joint between the two pipes will be rigid and fluid tight. In fact, even though the other joints be welded as heretofore explained, the sprinkling heads are preferably screwed into the sleeve-like projections 15 on the lines such as the pipe or conduit 6.

In Fig. 5 I have illustrated a preferred way of uniting two pipe sections by means of a screw joint; 22 representing either the larger of two frusto-conical pipe sections or a sleeve-like projection on a pipe or conduit and 23 being either the smaller of two connected frusto-conical pipe sections or any pipe, conduit or other tubular part of the system. One end of the member 23 is screwed into an end of the member 22, the screwthreads as a whole being indicated at 24. The end of member 22 is expanded to produce a cylindrical portion 25 having an abrupt annular shoulder 26 at the inner end where it joins the body portion of the pipe or conduit. When the member 23 is frusto-conical, its end 27 is deformed to give it a cylindrical shape that fits in the part 25 of the member 22 and abuts against the shoulder 26. With this arrangement of the parts, the interior or bore of the connected members remains smooth and continuous across the joint.

While I have illustrated and described with particularity only a single preferred form of my invention, with a single modification, I do not desire to be limited to the exact structural details thus illustrated and described; but intend to cover all forms and arrangements which come within the definitions of my invention constituting the appended claims.

I claim:

1. In a fire extinguishing sprinkler system, a cross main of ductile sheet metal composed of a plurality of long sections arranged end to end decreasing in diameter at a uniform rate from the inlet end of the main to the other end, the metal of said cross main being deformed to provide each section with short integral sleeve-like projections, and lines adapted to carry sprinkler heads each composed of a plurality of long sections and decreasing in diameter at a uniform rate from the end adjacent to the cross main to the other, each line making a butt joint with and welded to one of said projections, and projections on said lines, for the attachment of sprinkler heads, similar to the aforesaid projections.

2. In a fire extinguishing sprinkler system, a cross main of ductile sheet metal composed of a plurality of long sections arranged end to end decreasing gradually in diameter from the inlet end of the main to the other end, the metal of said cross main being deformed to provide each section with short integral sleeve-like projections, and lines adapted to carry sprinkler heads each decreasing gradually in diameter from the end adjacent to the cross main to the other, each line making a butt joint with and welded to one of said projections, and projections on said lines, for the attachment of sprinkler heads, similar to the aforesaid projections.

3. In a fire extinguishing sprinkler system, a cross main of ductile sheet metal decreasing gradually in diameter from the inlet end to the other end, the metal of said cross main being deformed to provide short integral sleeve-like projections, and lines adapted to carry sprinkler heads each decreasing gradually in diameter from the end adjacent to the cross main to the other, each line making a butt joint with and welded to one of said projections, the cross main and said lines each composed of a plurality of long sections arranged end to end and welded together, and projections on said lines, for the attachment of sprinkler heads, similar to the aforesaid projections.

WILLIAM GRIMSHAW.